(12) United States Patent
Vila et al.

(10) Patent No.: US 11,829,563 B2
(45) Date of Patent: Nov. 28, 2023

(54) METHOD FOR OPERATING A SAFETY-CRITICAL FUNCTION USING A TOUCH SENSOR

(71) Applicant: Electrolux Home Products, Inc., Charlotte, NC (US)

(72) Inventors: Roman Roman Vila, Springfield, TN (US); Omar Fernandez, Springfield, TN (US); Kristi Mare Cooke, Charlotte, NC (US)

(73) Assignee: Electrolux Home Products, Inc., Charlotte, NC (US)

( * ) Notice: Subject to any disclaimer, the term of this patent is extended or adjusted under 35 U.S.C. 154(b) by 2 days.

(21) Appl. No.: 17/503,502

(22) Filed: Oct. 18, 2021

(65) Prior Publication Data

US 2023/0121468 A1 Apr. 20, 2023

(51) Int. Cl.
*G06F 3/044* (2006.01)
*G06F 3/041* (2006.01)
*F24C 7/08* (2006.01)

(52) U.S. Cl.
CPC .......... *G06F 3/044* (2013.01); *G06F 3/04162* (2019.05); *F24C 7/085* (2013.01)

(58) Field of Classification Search
CPC ....... G06F 3/044; G06F 3/04162; F24C 7/085
See application file for complete search history.

(56) References Cited

U.S. PATENT DOCUMENTS

| | | | |
|---|---|---|---|
| 6,750,433 B2 | 6/2004 | Guenther et al. | |
| 9,058,024 B2 | 6/2015 | Montanye et al. | |
| 9,644,847 B2 | 5/2017 | Bhogal et al. | |
| 9,961,721 B2 | 5/2018 | Guilleminot et al. | |
| 10,032,365 B1 | 7/2018 | Xu et al. | |
| 10,830,452 B2 | 11/2020 | Gottsov et al. | |
| 2011/0087987 A1 | 4/2011 | Brown | |
| 2017/0168603 A1 | 6/2017 | Glotzbach et al. | |
| 2020/0003425 A1* | 1/2020 | Gottsov | F24C 14/00 |
| 2020/0005690 A1* | 1/2020 | Gottsov | G09G 3/3406 |

FOREIGN PATENT DOCUMENTS

| | | |
|---|---|---|
| CN | 104951225 | 9/2015 |
| CN | 208190625 | 12/2018 |
| CN | 208369557 | 1/2019 |

\* cited by examiner

*Primary Examiner* — Lisa S Landis
(74) *Attorney, Agent, or Firm* — Pearne & Gordon LLP

(57) ABSTRACT

A method for initiating a safety-critical function in an appliance. The method including receiving a first user input for the safety-critical function via a touchscreen and receiving a second user input confirming the safety-critical function via a first separate input element adjacent to the touchscreen. The operation of the touchscreen can be manipulated externally, directly or indirectly, via wireless communication while a safety-critical function is active. The first separate input element communicates via a wired connection to a control device that is not capable of being manipulated externally via wireless communication while a safety-critical function is active, wherein the control device controls initiation of the safety-critical function. In the method, both the first user input and the second user input are required to initiate the safety-critical function.

17 Claims, 5 Drawing Sheets

METHOD FOR OPERATING A SAFETY-CRITICAL FUNCTION USING A TOUCH SENSOR

FIELD

The present invention relates generally to a method for controlling a cooking appliance and, more particularly, to a method for implementing a safety-critical function using a capacitive key.

BACKGROUND

For safety reasons, the Underwriters Laboratories (UL) mandates (via standard UL 858) that a cooking appliance meet a Two-Steps-On and One-Step-Off requirement for certain 'safety-critical functions.' Such functions typically are those involving high temperatures, for example a pyrolytic-clean cycle for a cooking oven.

Under the current UL standard, one step of the Two-Steps-On process must be performed by a UL 60730 Class B compliant device. To be complaint, among other requirements the device must not be manipulable externally via wireless communication, e.g., via Bluetooth or Wi-Fi while a safety-critical function is active. For the One-Step-Off process, the appliance must provide at least one way to cancel the safety-critical function by a single user input (e.g. one touch) to a UL 60730 Class B compliant device.

Conventional appliances comply with the Two-Step-On and One-Step-Off requirements by using physical knobs or touchscreen displays that are UL 60730 Class B compliant. However, physical knobs are less visually appealing, and touchscreen displays that are UL 60730 Class B compliant are costly.

The present application discloses a method for performing a safety-critical function that makes use of an independent touch sensor not integrated with a touchscreen display.

SUMMARY

There is provided a method for initiating a safety-critical function in an appliance. The method including receiving a first user input for the safety-critical function via a touchscreen and receiving a second user input confirming the safety-critical function via a first separate input element adjacent to the touchscreen. The operation of the touchscreen can be manipulated externally, directly or indirectly, via wireless communication while a safety-critical function for the appliance is active. The first separate input element communicates via a wired connection to a control device that is not capable of being manipulated externally via wireless communication while the safety-critical function is active, wherein the control device controls initiation of the safety-critical function. In the method, both the first user input and the second user input are required to initiate the safety-critical function.

Furthermore, there is provided an appliance adapted to perform a safety-critical function. The appliance includes a user interface having a touchscreen display adapted to receive a first user input and a separate input element disposed adjacent to the touchscreen display and adapted to receive a second user input. A microcontroller is provided that is not capable of manipulation externally via wireless communication while a safety-critical function is active. The microcontroller is adapted to initiate the safety-critical function. The separate input element is in communication with the microcontroller via a wired connection. The microcontroller is programmed to initiate the safety-critical function only upon receiving a first signal calling up that safety-critical function originating from the first user input, and a second signal confirming the safety-critical function originating from the second user input.

Furthermore, there is provided a method for initiating a safety-critical function in an appliance. The method includes receiving a first user input selecting the safety-critical function via a touchscreen display; thereafter indicating on the touchscreen display a specific separate input element adjacent to but not part of the touchscreen display to confirm the safety-critical function; thereafter receiving a second user input via the specific separate input element adjacent to the touchscreen display via a signal supplied via a wired connection therefrom to a control device that cannot be manipulated externally via wireless communication while the safety-critical function is active; and the control device thereafter initiating the safety-critical function.

DETAIL DESCRIPTION

Examples will now be described more fully hereinafter with reference to the accompanying drawings in which example embodiments are shown. However, aspects may be embodied in many different forms and should not be construed as limited to the embodiments set forth herein. Moreover, certain terminology is used herein for convenience only and is not to be taken as a limitation.

Figure 1:
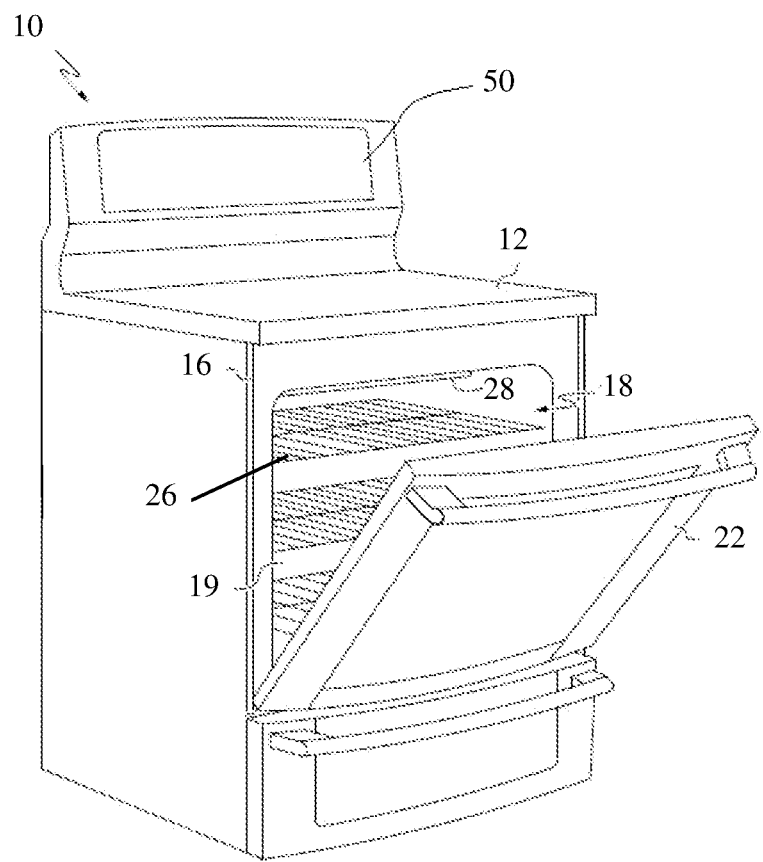
FIG. 1 is a simplified perspective view of an example cooking appliance.

FIG. 1 shows a front perspective view of a cooking appliance 10 (i.e. a free-standing range) according to an embodiment. It is contemplated that the cooking appliance 10 can be built-in or wall-mounted, or have another configuration. The illustrated appliance 10 includes a cooktop 12 and a cooking cavity 18 open at the front 16 of the appliance. A door 22 is attached at the front of the appliance 10 for selectively closing the cavity 18. The cavity 18 is dimensioned to receive one or more racks 26 therein for supporting food to be cooked. The racks 26 may engage embossments (not shown) on the side walls of the cavity 18.

A heating element 28 is disposed within the cavity 18. In the embodiment illustrated, the heating element 28 is an electric broil element that is position along a top wall of the cavity 18. It is contemplated that the heating element 28 can be a gas burner. It is further contemplated that a convection heating element (not shown) can be disposed along a rear wall 19 of the cavity 18 and/or a bake element (not shown) can be disposed along a bottom wall of the cavity 18. Indeed, one or more heating elements may be disposed within or associated with the cavity 18 to cook food therein, and also to perform other functions (such as pyrolytic clean).

Figure 2:
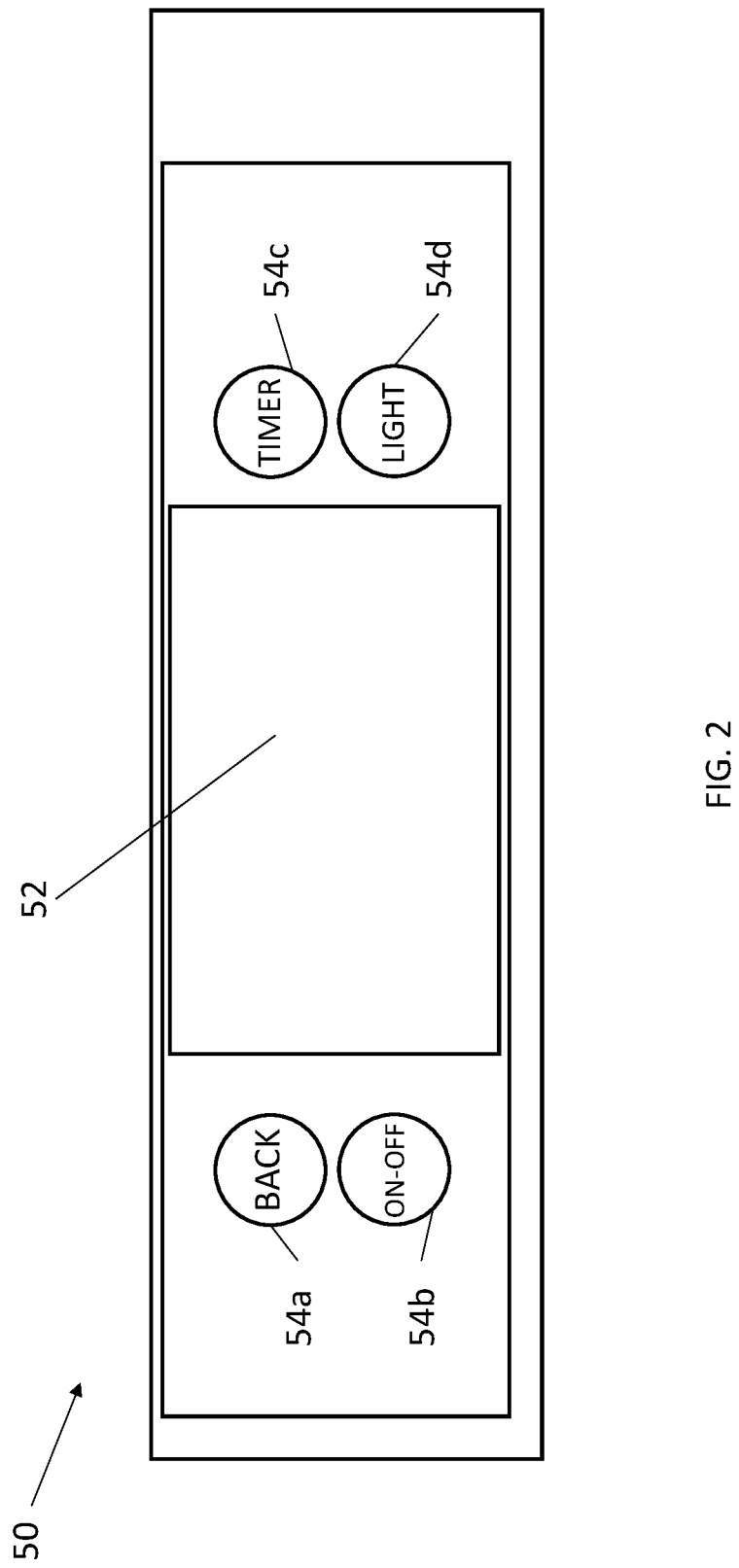
FIG. 2 is an enlarged front view of a display assembly of the cooking appliance of FIG. 1.

The cooking appliance 10 includes a user interface (UI) 50 for allowing a user to input commands to the cooking appliance 10. The UI 50 is configured to control the operation of the cooking appliance 10 based on input received from the user. Referring to FIG. 2, the UI 50 includes a touchscreen display 52 and a plurality of separate input elements such as touch sensors (e.g. capacitive-touch buttons) disposed outside of and adjacent to the display 52, e.g. on opposite sides thereof. In the embodiment illustrated there are four capacitive-touch buttons 54a, 54b, 54c, 54d. It is contemplated that the UI 50 can include more or fewer buttons outside of the display 52. Moreover, the separate input elements can be or include other control elements, including dial, knobs, tactile push-buttons, touch buttons that operate other than via capacitance sensors, or any other suitable input element. The touchscreen display 52 can be a resistive, capacitive, surface acoustic wave, infrared, optical imaging, or an acoustic pulse recognition touchscreen. It is also contemplated that the touchscreen display 52 can include a liquid crystal display (LCD) that is used in combination with one of the foregoing. Alternatively, the touchscreen display 52 may be configured and operable in any manner, the specific mode of its operation to receive and process touch inputs and to display graphical images or information being not critical to the present disclosure. The touchscreen display 52 is configured to display information regarding the operation of the appliance 10 and to accept touch inputs from the user regarding a function that the user desires the cooking appliance 10 to perform.

Figure 3:
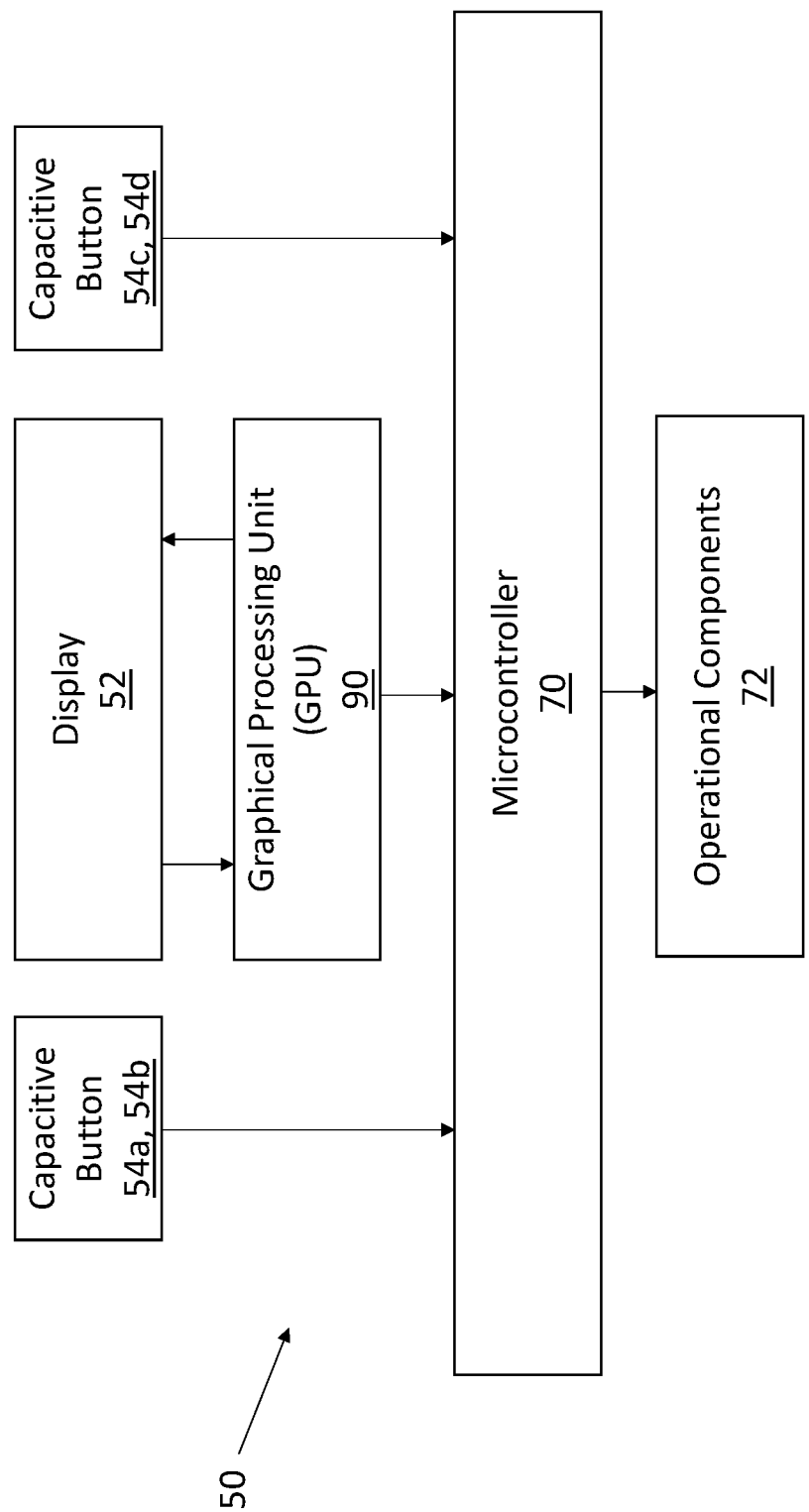
FIG. 3 is a block diagram of an exemplary control system of the cooking appliance of FIG. 1.

FIG. 3 illustrates a block diagram of the UI 50. In addition to the aforementioned display 52 (which can be a touchscreen) and separate input elements, such as buttons 54a, 54b, 54c, 54d (e.g. capacitive-touch buttons), the UI 50 includes at least two distinct computer processors; i.e. a graphical processing unit (GPU) 90 and a microcontroller 70 (also referred to as a "control device"). In the instant embodiment the GPU 90 is not a UL 60730 Class B compliant device; for example it can be a UL 60730 Class A-compliant device. As appreciated by those skilled in the art, such devices may be subject to manipulation externally via wireless communication such as Bluetooth or Wi-Fi while a safety-critical function is active. In contrast, the microcontroller 70 preferably is a UL 60730 Class B compliant devices, which among other things, as noted above, cannot be manipulated via wireless communication.

It is appreciated that the UL 60730 Class B compliant standard is updated periodically by UL. In the present application, the term "UL 60730 Class B compliant" refers to a device that meets the requirements of that standard in-effect as of October 2021 (i.e., the 4$^{th}$ Edition of UL 60730), and as that standard may be revised or updated from time to time so long as the revised/updated standard requires a device to conform substantially with safety and operational requirements at least as stringent, when taken together, as required by the standard as of October 2021. Chief among these is the requirement that a UL 60730 Class B compliant device must not be capable of manipulation externally via wireless communication, such as Bluetooth or Wi-Fi, while a safety-critical function is active.

Referring to FIG. 3, when a user supplies a command input via touch on the touchscreen display 52, that command is communicated to the GPU 90 for processing. The GPU 90 is primarily responsible for accepting and processing inputs entered via user interactions with the touchscreen display 52. Upon receiving and processing such inputs, the GPU 90 operates the display 52 in response to those inputs (e.g. adjusting or displaying different information responsive to user inputs, as appropriate), as well as sends command signals associated with those inputs to the microcontroller 70. The microcontroller 70 serves as an interface for processing commands to execute cooking functions via operational components 72 (e.g. heating elements, fans, etc.) of the appliance.

As noted, the microcontroller 70 preferably is a UL 60730 Class B compliant device, i.e. among other requirements it cannot be manipulated wirelessly while a safety-critical function is active. The microcontroller 70 can be an electronic controller and can include one or more processors for executing programmed instructions that cause the microcontroller 70 to operate operational components 72 of the appliance.

The microcontroller 70 can include memory adapted to store program instructions that, when executed by the microcontroller 70, cause the microcontroller 70 to provide the functionality ascribed to it herein, as well as data used to execute other operations as desired. For example, the memory can include lookup tables useful in executing selected cooking functions, user-profiles (i.e. information or data stored by a user specific to that user's cooking preferences) and any other information useful in the operation of the appliance. The microcontroller 70 can process inputs, either directly from selected input elements such as the capacitive-touch buttons 54a-54d (which interface with it directly), or from the GPU 90 (which receives inputs from the touchscreen display 52 and processes them to send corresponding commands to the microcontroller 70). The microcontroller 70 processes all these inputs from the variety of sources and generates control signals to control the operational components 72 of the appliance 10 for executing cooking or other functions based on these signals.

As illustrated, the microcontroller 70 is connected directly to the capacitive-touch buttons 54a, 54b, 54c, 54d, e.g. via a direct-wired connection such as on a printed circuit board (PCB—not shown). The buttons 54a, 54b, 54c, 54d can be positioned on opposite sides of the display 52, e.g. on a common PCB. In the embodiment illustrated in FIG. 2, there are two capacitive-touch buttons 54a, 54b adjacent to one side of the display 52 and two capacitive-touch buttons 54c, 54d adjacent to an opposite side of the display 52. When the capacitive-touch buttons 54a, 54b, 54c, 54d are actuated, the associated signals are sent directly to the microcontroller 70.

In one embodiment, the four capacitive-touch buttons 54a, 54b, 54c, 54d can be, for example: 1) a "Back" button, 2) an "On-Off" button, 3) a "Timer" button and 4) a "Light" button. Selection of the Back button causes the display 52 to return to the previous screen. Selection of the On-Off button causes the display 52 to turn off or on. Selection of the Timer button causes the display 52 to show a timer. Selection of the Light button causes an oven light in the cavity 18 to turn on or off.

During operation of the UI 50, the GPU 90 causes the display 52 to provide information to the user regarding available functions of the cooking appliance 10. In effect, the GPU 90 controls what is displayed on the touchscreen display 52 and is responsible for receiving and initially processing commands entered at that display 52. When the user selects a desired function by touching the display 52, that display 52 provides signals to the GPU 90 indicative of the requested function/operation. Thereafter, the GPU 90 provides a signal to the microcontroller 70 of the desired function as noted above. The microcontroller 70 then controls the operational components 72 of the appliance 10 (e.g. based the programmed instructions stored in its memory) to perform the requested function/operation based on the control signal from the GPU 90 corresponding to the original touch input at the display 52. As can be seen, inputs entered via the touchscreen display 52 are routed ultimately to two controllers in sequence: the GPU 90, which processes the touchscreen input, and thereafter the microcontroller 70, which receives a corresponding signal from the GPU 90. The GPU 90 itself does not interface with or control directly any operational component 72 of the appliance 10. In the illustrated embodiment, it directly controls only the touchscreen display 52.

Figure 4:
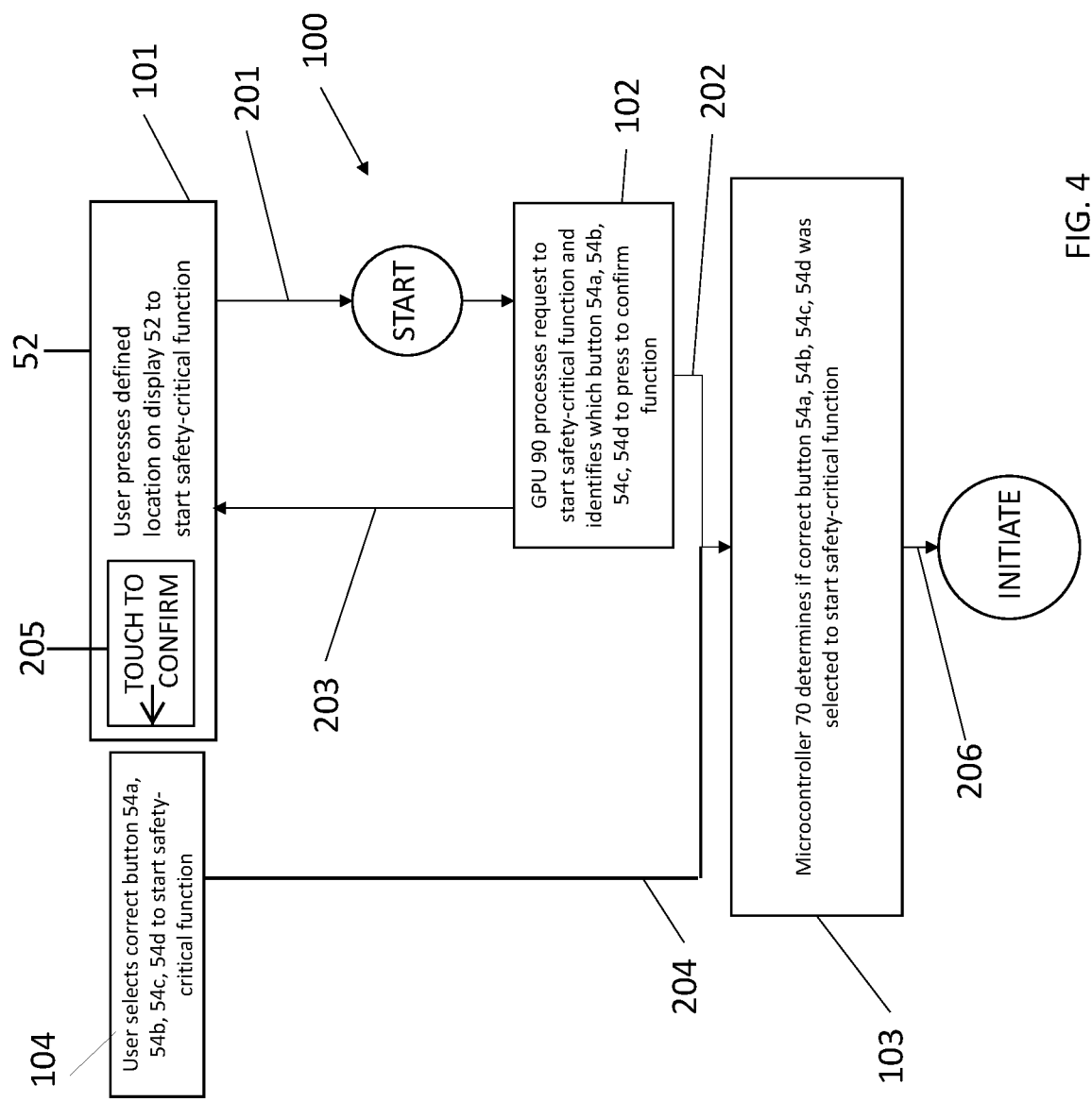
FIG. 4 is a flow diagram of a method for initiating a safety-critical operation of the cooking appliance of FIG. 1.
Figure 5:
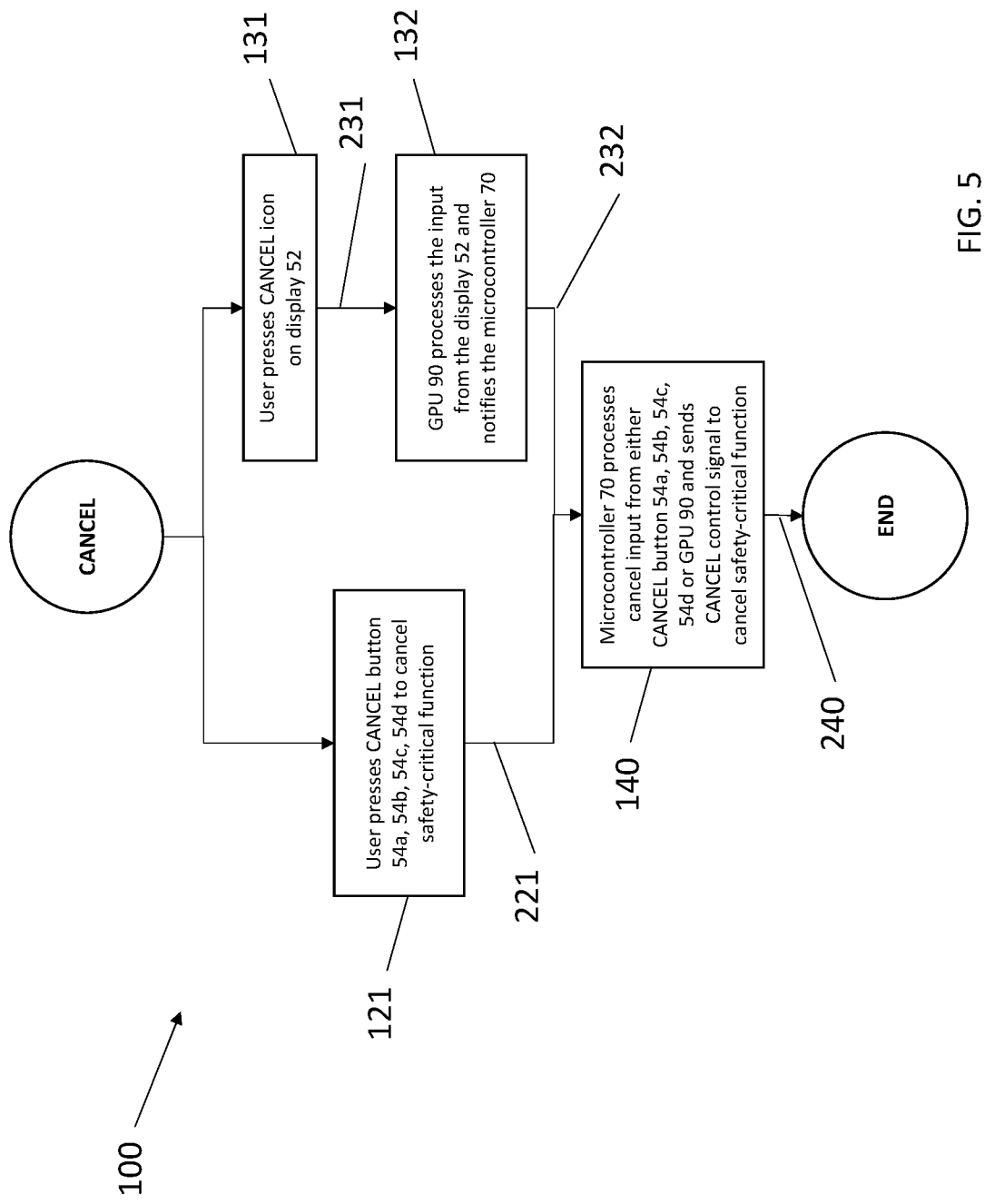
FIG. 5 is a flow diagram of a method for canceling the safety-critical operation of the cooking appliance of FIG. 1.

When a user selects a safety-critical function, e.g. pyrolytic cleaning, the UI 50 operates according to method 100 shown at FIGS. 4 and 5. FIG. 4 illustrates an exemplary Two-Steps-On control sequence executed by the UI 50, while FIG. 5 illustrates an exemplary One-Step-Off control sequence. Beginning with the Two-Steps-On sequence, at Step 101 the touchscreen display 52 receives an input calling up a safety-critical function, and sends a corresponding input signal 201 (also indicated by 'START' in FIG. 4) to the GPU 90 indicative of the safety-critical function selected by the user. At Step 102, the GPU 90 processes that input signal 201 and sends a corresponding initial control signal 202 to the microcontroller 70 indicative of the selected safety-critical function. Contemporaneous or in conjunction with sending the initial control signal 202 to the microcontroller 70, the GPU 90 also sends display signals 203 to the display 52 instructing the display 52 to adjust the displayed information in relation to the selected safety-critical function; e.g. to display confirmatory indicia 205 to notify the user (e.g. by displaying a pop-up window) of the need to actuate one of the capacitive-touch buttons 54a, 54b, 54c, 54d to confirm that the safety-critical function should be initiated. At Step 103, after receiving the initial control signal 202 from the GPU 90 indicative of the selected safety-critical function, the microcontroller 70 waits to receive a confirmatory input signal 204 signal from the correct button 54a, 54b, 54c, 54d before initiating the safety-critical function via a final control signal 206.

In Step 104, the user selects the button 54a, 54b, 54c, 54d that the GPU 90 indicated should be pushed by displaying the confirmatory indicia 205 on the display 52, in order to initiate the safety-critical function. The confirmatory input signal 204 from the appropriate button 54a, 54b, 54c, 54d is sent directly to the microcontroller 70 via a wired connection.

In Step 103, the microcontroller 70 processes the confirmatory input signal 204 to confirm that the correct button 54a, 54b, 54c, 54d was selected by the user. Upon confirmation, the microcontroller 70 then controls the operational components 72 (FIG. 3) via the final control signal 206 to implement the user-selected safety-critical function (shown at 'INITIATE' in FIG. 4).

As described above, the UI 50 complies with the Two-Steps-On requirement by combining an input from the display 52 via the GPU 90 (a non-Class B compliant device) with a confirmatory input (via confirmatory input signal 204) from the capacitive-touch buttons 54a, 54b, 54c, 54d delivered directly to the microcontroller 70 (preferably a Class B compliant device) via a wired connection. From the perspective of the user, in a first step the user touches a section of the display 52 corresponding to the desired safety-critical function, e.g., pyrolytic clean. Then the user is prompted (via the confirmatory indicia 205) to separately touch or press the appropriate button 54a, 54b, 54c, 54d to confirm that command, whereupon the safety-critical function will be initiated.

To comply with the One-Step-Off requirement, the illustrated method 100 provides two options to cancel the safety-critical function. To be compliant with UL 858, at least one of those options must be executed via a Class-B complaint device. Referring to FIG. 5, one option includes Step 121 where a user presses the appropriate button 54a, 54b, 54c, 54d to cancel the safety-critical function. This sends a CANCEL input signal 221 to the microcontroller 70, which processes that signal 221, and executes a CANCEL control signal 240 to stop the safety-critical function (i.e. to de-energize or deactivate the associated operational components 72 of the appliance 10). One or more of the available buttons 54a, 54b, 54c, 54d may be effective to generate a CANCEL input signal 221. Optionally, the display 52 may display appropriate indicia (not shown) similar to indicia 205, to indicate which button(s) 54a-54d is effective to cancel the safety-critical function while it is operating. Because this option to cancel the safety-critical function relies on a CANCEL input signal delivered directly (via a wired connection) from the input element (in this case capacitive-touch buttons 54a-54d) to a Class-B complaint device (the microcontroller 70), this One-Step-Off operation is UL 858 compliant.

The method 100 also includes a parallel option to cancel a safety-critical function, which proceeds via Steps 131 and 132, utilizing the GPU 90. In this parallel option, a user selects cancel icon on the touchscreen display 52, which sends a CANCEL input signal 231 to the GPU 90. In Step 132, the GPU 90 receives the CANCEL input signal 231 from the display 52 indicative of the user selecting to cancel the safety-critical function. On processing that signal, the GPU 90 sends a corresponding initial CANCEL control signal 232 to the microcontroller 70. Then in Step 140, the microcontroller 70 processes that initial CANCEL control signal 232 and executes a corresponding final CANCEL control signal 240 to cancel the safety-critical operation by de-energizing or deactivating the associated operational components 72.

As described in detail above, the method 100 complies with the One-Step-Off requirement by providing the user with the option to cancel the safety-critical function using the button 54a, 54b, 54c, 54d whose signals are received directly and processed by the microcontroller 70, i.e., a UL 60730 Class B compliant device. This way, if the second option to cancel the safety-critical function (via steps 131, 132) fails due to external (wireless) interference, there remains a reliable Class-B compliant pathway to cancel that function.

In one embodiment, the button 54a is a Back button, button 54b is an On-Off button, button 54c is a Timer button and button 54d is a Light button. The button 54b (the On-Off button) and the button 54c (the Timer button) can be used during the Two-Steps-On and One-Step-Off process explained above. In particular, during the Two-Steps-On process the button 54c (the Timer button) is used in the second step of the process to initiate the safety-critical operation. The button 54b (the On-Off button) can be selected during the One-Step-Off process as the single step to end the safety-critical operation. As described, the buttons 54b, 54c have two functions. The software in the microcontroller 70 can determine if the signals from the buttons 54b, 54c are for the respective On-Off or Timer functions, or if the signals are for the respective start or cancel functions, based on the function that was previously selected on the display 52 by the user. For example, if the user selected BAKE and then selected button 54b, the microcontroller 70 is configured to determine that the user intended the On-Off function, not the Start function. Similarly, if the user selected a safety-critical function and then selected button 54b the microcontroller 70 is configured to determine that the user intends to confirm initiation of the safety-critical function via the button 54b.

Although the invention has been described with respect to select embodiments, it shall be understood that the scope of the invention is not to be thereby limited, and that it instead shall embrace all modifications and alterations thereof coming within the spirit and scope of the appended claims.

The invention claimed is:

1. A method for initiating a safety-critical function in an appliance, comprising:
   receiving a first user input for the safety-critical function via a touchscreen;
   displaying on the touchscreen, after receiving said first user input thereon, confirmatory indicia to inform a user regarding a specific separate input element among a plurality thereof that must be manipulated to confirm initiation of the safety-critical function, wherein said touchscreen is a touchscreen display; and
   receiving a second user input confirming the safety-critical function via the specific separate input element adjacent to the touchscreen;
   wherein operation of the touchscreen can be manipulated externally, directly or indirectly, via wireless communication while the safety-critical function for the appliance is active;
   wherein the specific separate input element communicates via a wired connection to a control device that is not capable of being manipulated externally via wireless communication while the safety-critical function is active, wherein the control device controls initiation of the safety-critical function;
   wherein both the first user input and the second user input are required to initiate the safety-critical function, and
   wherein the safety-critical function is canceled upon receiving a first CANCEL user input via the touchscreen.

2. The method of claim 1, further comprising:
   wherein the safety-critical function is independently canceled by:
      receiving a second CANCEL user input via the specific separate input element or via a second separate input element that communicates via a wired connection to the control device while the safety-critical function is active.

3. The method of claim 1, wherein the appliance is a cooking appliance and the safety-critical function is a pyrolytic cleaning cycle for a cooking cavity of the cooking appliance.

4. The method of claim 1, wherein the touchscreen is not UL 60730 Class B compliant.

5. The method of claim 1, wherein the control device is UL 60730 Class B compliant.

6. An appliance adapted to perform a safety-critical function, comprising:
   a user interface having a touchscreen display adapted to receive a first user input and a separate input element disposed adjacent to the touchscreen display and adapted to receive a second user input, wherein the touchscreen display is configured to provide an indication to a user regarding a specific separate input element among a plurality thereof that must be manipulated to confirm initiation of a safety-critical function; and
   a microcontroller that is not capable of manipulation externally via wireless communication while the safety-critical function is active and that is adapted to initiate the safety-critical function;
   wherein the specific separate input element is in communication with the microcontroller via a wired connection,
   the microcontroller being programmed to initiate the safety-critical function only upon receiving a first signal calling up that safety-critical function originating from said first user input, and a second signal confirming the safety-critical function originating from said second user input, and
   wherein the safety-critical function is canceled upon receiving a first CANCEL user input via the touchscreen display.

7. The appliance of claim 6, further comprising a graphical processing unit that is capable of manipulation externally via wireless communication while a safety-critical function is active and which is configured to receive and process input signals from the touchscreen display, said graphical processing unit being further configured to supply said first user input to said microcontroller based on a corresponding user input on said touchscreen display.

8. The appliance of claim 7, wherein the graphical processing unit is not UL 60730 Class B compliant.

9. The appliance of claim 6, wherein the appliance is a cooking appliance and the safety-critical function is a pyrolytic cleaning cycle.

10. The appliance of claim 6, the specific separate input element being a capacitive-touch button.

11. The appliance of claim 6, wherein the microcontroller is UL 60730 Class B compliant.

12. A method for initiating a safety-critical function in an appliance, comprising:
   receiving a first user input selecting the safety-critical function via a touchscreen display;
   thereafter indicating on the touchscreen display a specific separate input element adjacent to but not part of the touchscreen display to confirm the safety-critical function;
   thereafter receiving a second user input via the specific separate input element adjacent to the touchscreen display via a signal supplied via a wired connection therefrom to a control device that cannot be manipulated externally via wireless communication while the safety-critical function is active; and
   the control device thereafter initiating the safety-critical function,
   wherein the safety-critical function is canceled upon receiving a first CANCEL user input via the touchscreen display.

13. The method of claim 12, further comprising:
   wherein the safety-critical function is independently canceled by
      receiving a second CANCEL user input via the specific separate input element or via a second separate input element that communicates via a wired connection with the control device.

14. The method of claim 12, wherein the appliance is a cooking appliance and the safety-critical function is a pyrolytic cleaning cycle for a cooking cavity of the cooking appliance.

15. The method of claim 12, said first user input being communicated from said touchscreen display to a graphical processing unit for processing, said graphical processing unit being capable of manipulation externally via wireless communication while a safety-critical function is active.

16. The method of claim 15, wherein the graphical processing unit is not UL 60730 Class B compliant.

17. The method of claim 12, wherein the control device is UL 60730 Class B compliant.

\* \* \* \* \*